March 19, 1929. G. A. PROCTOR 1,705,681
MANUALLY PROPELLED VEHICLE FOR CHILDREN
Filed May 28, 1927 2 Sheets-Sheet 1

INVENTOR.
George A. Proctor,
BY Arthur P. Knight and
Alfred W. Knight
ATTORNEYS

March 19, 1929. G. A. PROCTOR 1,705,681
MANUALLY PROPELLED VEHICLE FOR CHILDREN
Filed May 28, 1927   2 Sheets-Sheet 2
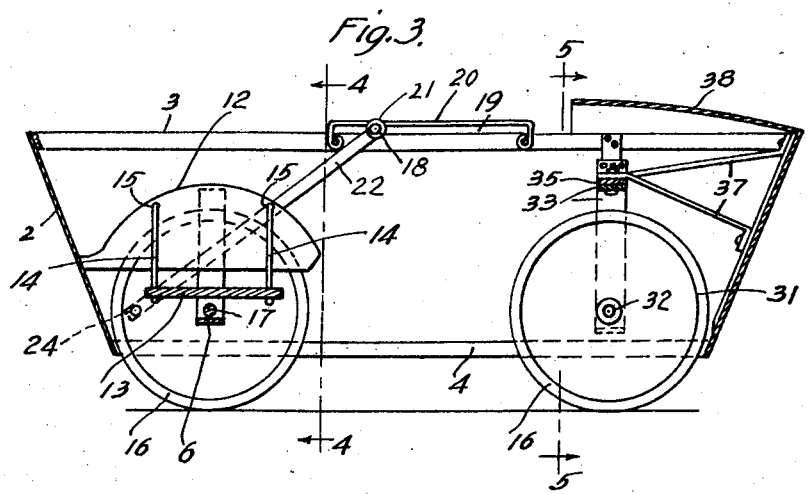
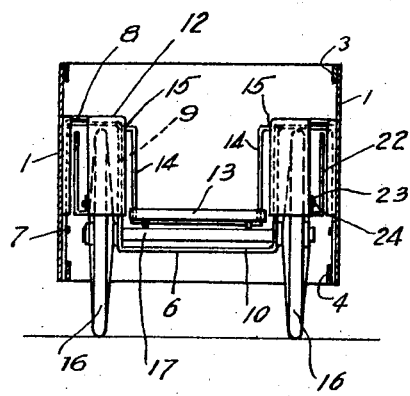
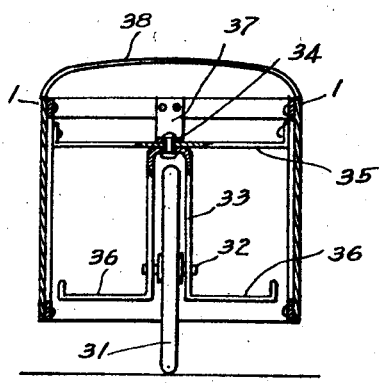
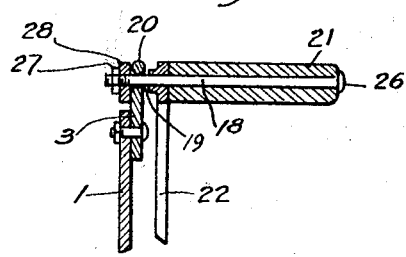
INVENTOR.
George A. Proctor,
BY Arthur P. Knight and
Alfred W. Knight
ATTORNEYS Patented Mar. 19, 1929.

1,705,681

UNITED STATES PATENT OFFICE.

GEORGE A. PROCTOR, OF LOS ANGELES, CALIFORNIA, ASSIGNOR OF ONE-HALF TO CONAN D. HIGGINSON, OF LOS ANGELES, CALIFORNIA.

MANUALLY-PROPELLED VEHICLE FOR CHILDREN.

Application filed May 28, 1927. Serial No. 194,885.

This invention relates to a child's vehicle adapted for manual propulsion, and the main object of the invention is to provide a novel means for propelling a vehicle of this type. A particular object of the invention is to provide a vehicle of this type which is adapted to be propelled by movements of the arms similar to the movements involved in rowing a boat.

A further object of the invention is to provide a seat for the occupant of the vehicle, which is capable of swinging back and forth in a horizontal plane during the operation of the vehicle.

The vehicle comprises essentially a body having a pair of rear driving wheels rotatably mounted thereon, a single forward guide wheel, a seat suspended from the rear portion of the body and between said driving wheels, preferably in such manner as to permit swinging movement thereof longitudinally of the vehicle, a pair of reciprocating members provided with handle means, longitudinal guide means at the respective sides of the body within which said reciprocating members are slidably mounted for reciprocating motion thereof, and connecting rod members operatively connecting the respective reciprocating members with the driving wheels so as to cause said wheels to rotate in response to reciprocating movement of said reciprocating members.

The accompanying drawings illustrate a vehicle according to our invention and referring thereto.

Fig. 3 is a longitudinal section of the vehicle.

Fig. 4 is a section on line 4—4 in Fig. 3.

Fig. 5 is a section on line 5—5 in Fig. 3.

Fig. 6 is a partial section on line 6—6 in Fig. 1.

Figure 1:
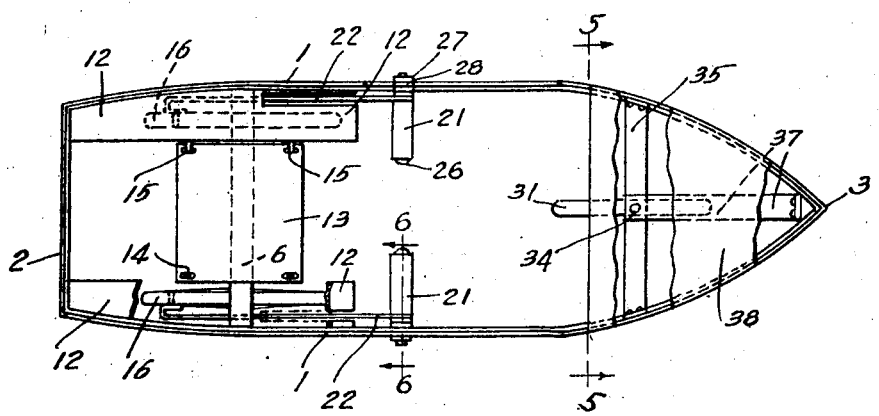
Fig. 1 is a plan view of such vehicle, with certain parts broken away.
Figure 2:
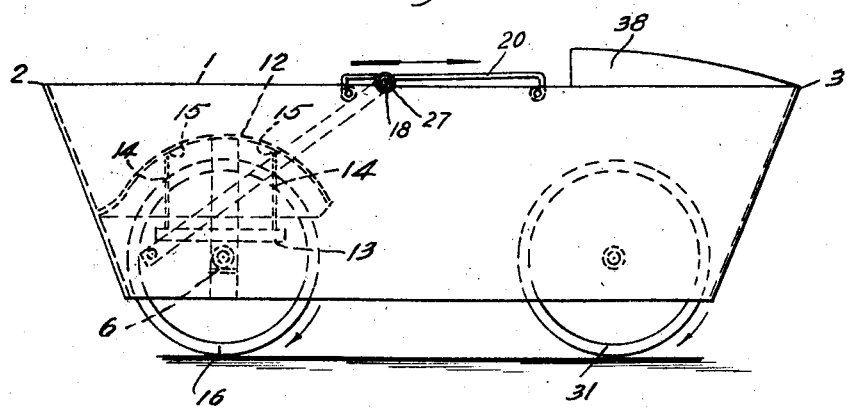
Fig. 2 is a side elevation thereof.

The vehicle comprises a body including side members 1 and a rear member 2, said side members converging toward the front of the vehicle so as to form a pointed nose indicated at 3, in simulation of the shape of a boat. The above mentioned body members may be constructed of any suitable light weight material such as light sheet metal. Reenforcing strips 3 and 4 are preferably provided along the upper and lower edges of said body members so as to provide the necessary rigidity. A supporting strap 6 extends across between the side members 1 near the rear end of the vehicle, said strap extending upwardly alongside each side member and being secured thereto in any suitable manner as by means of rivets or bolts indicated at 7, then extending inwardly as at 8, downwardly as at 9, and horizontally across the central portion of the vehicle as at 10. A fender or guard 12 is mounted on said strap 6 at each side of the vehicle above the position occupied by the respective wheels so as to prevent any portion of the occupant or his clothing from becoming entangled with the wheels or driving mechanism. A seat 13 is mounted between the fenders 12, preferably in such manner as to permit the same to swing or move backward and forward. For this purpose said seat may be mounted on two supporting rods 14, said rods being pivotally mounted at their upper ends for example as at 15 on the fenders 12, and said seat being loosely supported on said rods. This construction therefore permits the seat to swing backward and forward while maintaining the same substantially horizontal. Driving wheels 16 are mounted beneath the respective fenders 12 upon the ends of a shaft or axle 17 supported on strap 6. Said wheels may be rotatable on said shaft or if desired the wheels may be secured to the shaft and said shaft may be rotatable in suitable bearings on strap 6. It will be noted that by mounting the seat between the driving wheels, wheels of a large diameter may be used so as to permit rapid propulsion of the vehicle, while still maintaining the seat well below the top of the side walls and sufficiently low so that the manual operating means hereinafter described may be handled without undue stooping or bending forward of the occupant.

A pair of reciprocating members such as rods or bolts 18 are slidably mounted on the side members 1. For this purpose said reciprocating members may extend through longitudinal guide ways or slots 19 formed between the upper edges of side members 1 or the upper reenforcing strips 3 and guide rods 20 secured to said reenforcing strips and extending parallel thereto but spaced therefrom sufficiently to permit passage of the reciprocating members 18 therethrough. Suitable handle means 21 are provided on reciprocating members 18, and each of said reciprocating members is connected by a link or connecting rod 22 to the driving wheel 16 at that side of the vehicle. In order to connect each connecting rod 22 to the wheel and permit said connecting rod to pass over the hub of the wheel, said connecting rod may advantageously be bent over and doubled back at its rear end as at 23, and such doubled back portion may be connected to the wheel as by pin 24. The reciprocating members 18 may be headed at their inner ends as at 26 and may be threaded at their outer ends to receive retaining nuts 27 so as to hold the parts in assembled position as shown in Fig. 6, a small washer 28 being preferably provided between nut 27 and guide means 3 and 20.

A single wheel 31 is rotatably mounted at the forward end of the vehicle, said wheel being preferably mounted in such manner as to permit turning thereof in a horizontal plane to guide the vehicle. For this purpose said wheel may be mounted by means of shaft 32 upon a yoke 33 pivotally mounted at 34 upon cross member 35 secured to the body in any suitable manner. Said yoke may be formed or provided with suitable foot rests 36, which not only serve as a means for bracing the feet during operation of the vehicle but also permit turning of the wheel 31 in a horizontal plane for guiding purposes. The supporting means for the front wheel may be further strengthened by means of braces 37 secured to the front end of the body. A hood 38 may be provided over the forward end of the vehicle if desired.

The operation of the above described vehicle is as follows: The occupant sits on seat 13 with his feet resting on the foot rest 36 and grasps the handle 21 on one of the reciprocating members 18 in each hand. By moving these members backward and forward in the longitudinal guide ways 19, rotating motion may be imparted through connecting rods 22 to the driving wheel 16, in the usual manner of transmitting motion from a reciprocating member to a rotary member through a connecting rod. The two reciprocating members may be moved backward and forward in unison or may be moved alternately, one of said members being moved forward while the other is moved backward and vice versa. This corresponds exactly to the two similar methods of rowing a boat, namely by stroking with both oars in unison, or by alternating the movements of the oars. In case either of the connecting rods should be in dead center position, or in any case in order to facilitate starting of the vehicle, the occupant may push on the ground with his feet to start the same in motion. Normally, however, the momentum of the vehicle and the wheels will carry the connecting rods past dead center so as to permit smooth operation of the vehicle. The occupant's feet will therefore normally be kept in position on the foot rests 36 so as to cause the front or guide wheel 31 to maintain the desired course.

In order to facilitate the rowing or propelling operation above described it may be preferable to permit the body of the occupant to move backward and forward to a slight extent, and this is permitted by means of the above described mounting means 14 which permit seat 13 to swing backward and forward while maintaining the same in a horizontal plane.

I claim:

1. A manually propelled vehicle comprising a body, a pair of driving wheels rotatably mounted upon the rear portion of said body, a seat supported upon the rear portion of said body and disposed between said driving wheels, reciprocating means slidably mounted at the respective sides of said body having handle means for manual operation thereof, means operatively connecting each of said reciprocating means to one of said driving wheels for causing rotation of said driving wheels in response to reciprocating motion of said reciprocating means, and a single guide wheel rotatably mounted upon the front portion of said body.

2. A manually propelled vehicle as set forth in claim 1, said body including two side members extending substantially throughout the length of the vehicle and downwardly to a point below the centers of said wheels, and all of said wheels being located between said side members.

3. A manually propelled vehicle comprising a body having side members, a transverse supporting member secured to said side members, a pair of driving wheels rotatably mounted on said transverse supporting member inside the respective side members, a guard means extending over the upper portion of each of said driving wheels and secured to said transverse supporting member, a seat mounted between said guard members, reciprocating means at the respective side of the vehicle having handle means for manual operation thereof, and means operatively connecting each of said reciprocating means to the driving wheel at the same side of the vehicle for causing rotation of said driving wheels in response to reciprocating motion of said reciprocating means.

4. A manually propelled vehicle comprising a body including two side walls, a pair of driving wheels rotatably mounted inside the rear portions of said body, a single guide wheel rotatably mounted upon the forward portion of the respective side walls, reciprocating means at the respective sides of said body, connecting rod means extending inside the respective side walls and operatively connecting each of said reciprocating means to one of said driving wheels, a seat, and means supporting said seat upon the rear portion of said body and between said driving wheels.

5. A manually propelled vehicle as set forth in claim 4, said means for supporting said seat being adapted to permit said seat to swing longitudinally of the vehicle while maintaining said seat in a substantially horizontal plane.

6. A manually propelled vehicle as set forth in claim 4, said connecting rod means extending between the respective side walls and the driving wheels, and said driving wheels being supported by strap means secured to the side walls and extending inwardly above said driving wheels and downwardly inside the same, and axle means supported on said strap means, the outer ends of said axle means being spaced from the inside of the side walls so as to provide a space therebetween for movement of said connecting rod means.

7. A manually propelled vehicle comprising a body including two side walls, a pair of driving wheels rotatably mounted inside the respective side walls adjacent the rear end of the body, a single guide wheel rotatably mounted between the side walls adjacent the forward portion of said body, reciprocating means slidably mounted upon the respective side walls, connecting rod means extending inside the respective side walls and operatively connecting the corresponding reciprocating means and driving wheels, and a seat mounted within the rear portion of said body.

In testimony whereof I have hereunto subscribed my name this 17th day of May, 1927.

GEORGE A. PROCTOR.